US008601450B2

(12) United States Patent
Su

(10) Patent No.: US 8,601,450 B2
(45) Date of Patent: Dec. 3, 2013

(54) METHODS AND SYSTEMS FOR COMPILING A SHADING PROCESS OF A 3D COMPUTER GRAPHICS

(75) Inventor: Chien-Fu Su, Taipei (TW)

(73) Assignee: Via Technologies, Inc., Hsin-Tien, Taipei (TW)

(*) Notice: Subject to any disclaimer, the term of this patent is extended or adjusted under 35 U.S.C. 154(b) by 1553 days.

(21) Appl. No.: 11/774,078

(22) Filed: Jul. 6, 2007

(65) Prior Publication Data
US 2008/0059956 A1 Mar. 6, 2008

(30) Foreign Application Priority Data

Aug. 30, 2006 (TW) .............................. 95132004 A

(51) Int. Cl.
*G06F 9/45* (2006.01)
(52) U.S. Cl.
USPC ........................................................ 717/143
(58) Field of Classification Search
USPC ......... 717/107, 127, 133, 136, 140, 105, 115, 717/143; 719/328; 716/103, 18; 355/18; 345/551; 712/209, 34, 15, 244; 382/303, 276; 709/227; 715/513
See application file for complete search history.

(56) References Cited

U.S. PATENT DOCUMENTS

| 5,586,330 | A  | * | 12/1996 | Knudsen et al. ............... 717/136 |
| 5,870,085 | A  | * | 2/1999  | Laksono ......................... 345/551 |
| 5,870,590 | A  | * | 2/1999  | Kita et al. ...................... 716/103 |
| 6,418,448 | B1 | * | 7/2002  | Sarkar ................................... 1/1 |
| 7,050,143 | B1 | * | 5/2006  | Silverbrook et al. ............ 355/18 |
| 7,313,773 | B1 | * | 12/2007 | Braun et al. .................... 716/103 |
| 7,356,764 | B2 | * | 4/2008  | Radja et al. .................... 715/234 |
| 7,818,729 | B1 | * | 10/2010 | Plum et al. ..................... 717/140 |
| 2002/0194483 | A1 | * | 12/2002 | Wenocur et al. .............. 713/185 |
| 2004/0260914 | A1 | * | 12/2004 | Gee et al. ...................... 712/221 |
| 2005/0155014 | A1 | * | 7/2005  | Andrade et al. .............. 717/105 |
| 2005/0240943 | A1 | * | 10/2005 | Smith et al. ................... 719/328 |
| 2006/0004997 | A1 | * | 1/2006  | Mykland ....................... 712/244 |
| 2006/0056728 | A1 | * | 3/2006  | Silverbrook et al. ......... 382/276 |
| 2007/0124717 | A1 | * | 5/2007  | Deur et al. ...................... 716/18 |

OTHER PUBLICATIONS

Mika Nystrom, "SAM architecture Reference", Apr. 2002 pp. 1-6 <Sam_Ref2000.pdf>.*
CN office action mailed Aug. 17, 2007.
"ARM System Structure and Program" Feb. 2003.
"C Program Design" Jan. 2001.

* cited by examiner

*Primary Examiner* — Tuan A Vu
(74) *Attorney, Agent, or Firm* — McClure, Qualey & Rodack, LLP

(57) ABSTRACT

A method for a 3D computer graphics shading process compiler, utilized to generate hardware machine code corresponding to a script is disclosed. The method includes the following steps. Operation mapping code indicating an operation of the script, and argument mapping code indicating an argument associated with the operation is provided. The hardware machine code is generated by performing a bitwise OR operation to the operation mapping code and the argument mapping code.

43 Claims, 14 Drawing Sheets

```
FFPSCompiler() {
    Switch (operation) {
        Case Add: ──111
            ProcessArguments(args);
            ProcessModifier(mods);
            Generate hw instructions;
            Break;
        Case Mul: ──113
            ProcessArguments(args);
            ProcessModifier(mods);
            Generate hw instructions;
            Break;
    ...}
    ProcessArguments(arguments) {
        Switch (argument) {
            Case Diffuse:    ...──121
            Case Specular:   ...──123
            Case Texture:    ...──125
            Case Current:    ...──127
            ...}
    ProcessModifer(modifiers) {
        Switch (modifier) {
            Case x2:    ...──131
            Case x4:    ...──133
            Case Neg:   ...──135
            Case Abs:   ...──137
            ...}}}
```

FIG. 1

| Operation | Mapping code | |
|---|---|---|
| add | 0x01000000 | —71 |
| mul | 0x02000000 | —72 |
| sub | 0x03000000 | —73 |
| select arg1 | 0x04000000 | —74 |
| select arg2 | 0x05000000 | —75 |
| add_sign | 0x06000000 | —76 |
| dot product3 | 0x07000000 | —77 |
| mul_2x | 0x08000000 | —78 |

FIG. 7

| First argument | Mapping code |
|---|---|
| Current | 0x00100000 |
| Diffuse | 0x00200000 |
| Specular | 0x00300000 |
| Texture | 0x00400000 |
| Temp | 0x00500000 |

FIG. 8a

| Second argument | Mapping code |
|---|---|
| Current | 0x00010000 |
| Diffuse | 0x00020000 |
| Specular | 0x00030000 |
| Texture | 0x00040000 |
| Temp | 0x00050000 |

FIG. 8b

| Third argument | Mapping code |
|---|---|
| Current | 0x00001000 |
| Diffuse | 0x00002000 |
| Specular | 0x00003000 |
| Texture | 0x00004000 |
| Temp | 0x00005000 |

FIG. 8c

| Third modifier | Mapping code |
|---|---|
| Neg | 0x00000001 |  — 951
| Abs | 0x00000002 |  — 952
| x2 | 0x00000003 |  — 953
| x4 | 0x00000004 |  — 954

FIG. 9c

METHODS AND SYSTEMS FOR COMPILING A SHADING PROCESS OF A 3D COMPUTER GRAPHICS

BACKGROUND

The invention relates to 3D computer graphics, and more particularly, to methods and systems for a 3D computer graphics shading process compiler.

In computer graphics, rendering converts 3D objects in a database into 2D images rendered on video display, mainly comprising establishing polygon models, processing visible and invisible polygons, and shading.

Graphics chips/chipsets typically comprise a compiler for receiving and converting scripts from an application into recognized hardware machine code. Conventional compilers distinguish operations, arguments and modifiers by condition branches, and provide corresponding hardware machine code in condition branches. FIG. 1 is a diagram of pseudo code of a conventional compiler, comprising condition branches 111 and 113 for distinguishing operations, condition branches 121 to 127 for distinguishing arguments, and condition branches 131 to 137 for distinguishing modifiers. These condition branches, however, consume excessive computational power.

SUMMARY

Methods for shading process compiler of 3D computer graphics are provided. An embodiment of a method for shading process compiler of 3D computer graphics, utilized to generate hardware machine code corresponding to a script, comprises the following steps. Operation mapping code indicating an operation of the script, and argument mapping code indicating an argument associated with the operation are provided. The hardware machine code is generated by performing a bitwise OR operation to the operation mapping code and the argument mapping code.

A machine-readable storage medium for storing a computer program which, when executed, performs the methods for shading process compiler of 3D computer graphics.

Systems for shading process compiler of 3D computer graphics are provided. An embodiment of a system for shading process compiler of 3D computer graphics comprises a graphics process integrated circuits (IC) and a processing unit. The processing unit, coupling to the graphics process IC, provides operation mapping code indicating an operation of the script, and argument mapping code indicating an argument associated with the operation, generates the hardware machine code by performing a bitwise OR operation to the operation mapping code and the argument mapping code, and transmits the generated hardware machine code to the graphics process IC in order to direct the graphics process IC to complete a texturing process.

The lengths of the operation mapping code, argument mapping code and modifier mapping code are the same as the length of the hardware machine code. The hardware machine code may store information associated with the operation in a first bit range, the argument in a second bit range, and the modifier in a third bit range. The operation mapping code may store zero in bits other than the first bit range, the argument mapping code may store zero in bits other than the second bit range, and the modifier mapping code may store zero in bits other than the third bit range.

BRIEF DESCRIPTION OF DRAWINGS

The invention will become more fully understood by referring to the following detailed description with reference to the accompanying drawings, wherein:

FIG. 1 is a diagram of pseudo code of a conventional compiler;

FIG. 7 is a diagram of an embodiment of an operation mapping table;

FIG. 8a is a diagram of an embodiment of a first argument mapping table;

FIG. 8b is a diagram of an embodiment of a second argument mapping table;

FIG. 8c is a diagram of an embodiment of a third argument mapping table;

FIG. 9c is a diagram of an embodiment of a third modifier mapping table;

DETAILED DESCRIPTION

Figure 2:
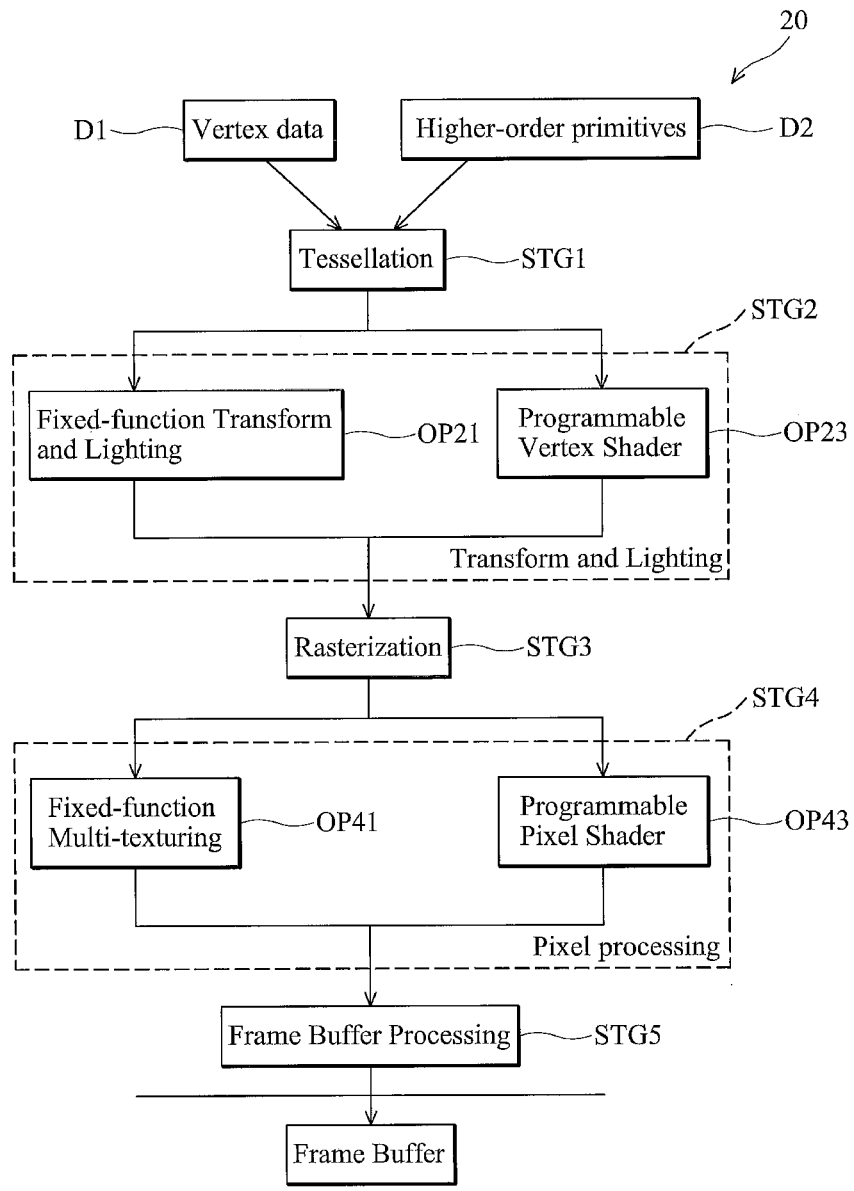
FIG. 2 is a diagram illustrating an embodiment of a 3D computer graphics pipeline.

FIG. 2 is a diagram illustrating an embodiment of a 3D computer graphics pipeline. The pipeline converts geometric data into an image rendered on a video display. A tessellation stage STG1 of the pipeline converts a fixed set of chip/chipset defined higher-order primitives, which include triangle patches, rectangle patches, and polygon patches (although triangle patches remain the most common form of geometry), into triangles. The more triangles used to represent a surface, the more realistic the rendering, but the more computation is required.

A transform and lighting stage STG2 of the pipeline transforms vertex positions and normals from the model coordinate system to the world and camera coordinate systems. Transform refers to the task of converting coordinates in space, which, for example, involves moving 3D objects in a virtual world and converting 3D coordinates to a 2D view. The vertex positions are then transformed by the projection transformation to create a perspective, orthographic, or similar type of projection. Lighting refers to the task of taking light objects in a virtual scene, and calculating the resulting color of surrounding objects as the light falls upon them. Per-vertex lighting calculations are performed to determine the specular and diffuse color components. The transform and lighting stage STG2 comprises two processes, such as a fixed-function transform and lighting OP21 and a programmable vertex shader OP23, to facilitate applications to employ predefined transform and lighting functions provided by chip/chipset.

A rasterization stage STG3 of the pipeline converts a set of vectors containing vertex positions and normals into pixels for displaying. During the rasterization stage STG3, any vertices belonging to objects that are not visible are clipped. Back-face culling may be performed to avoid rasterizing triangles that are the reverse side of objects. Attribute evaluation is performed to configure and select the actual algorithms to be used during the rasterization stage STG3. Finally, rasterization is performed to actually render the pixels.

A pixel processing stage STG4 of the pipeline determines the color value of a pixel. The pixel processing stage STG4 comprises two processes, such as a fixed-function multi-texturing OP41 and a programmable pixel shader OP43, to facilitate applications to employ predefined chip/chipset provided pixel processing functions. The fixed-function multi-texturing is exposed through a cascade of texture stages with each stage enabling a fixed set of operations to be performed on the color and alpha values of a pixel. Pixel shaders provide flexibility by exposing the operations performed on the color and alpha values through a custom assembly language.

A frame buffer processing stage STG5 of the pipeline handles memory regions comprising the well-known render surface buffer, depth buffer and stencil buffer.

Figure 3:
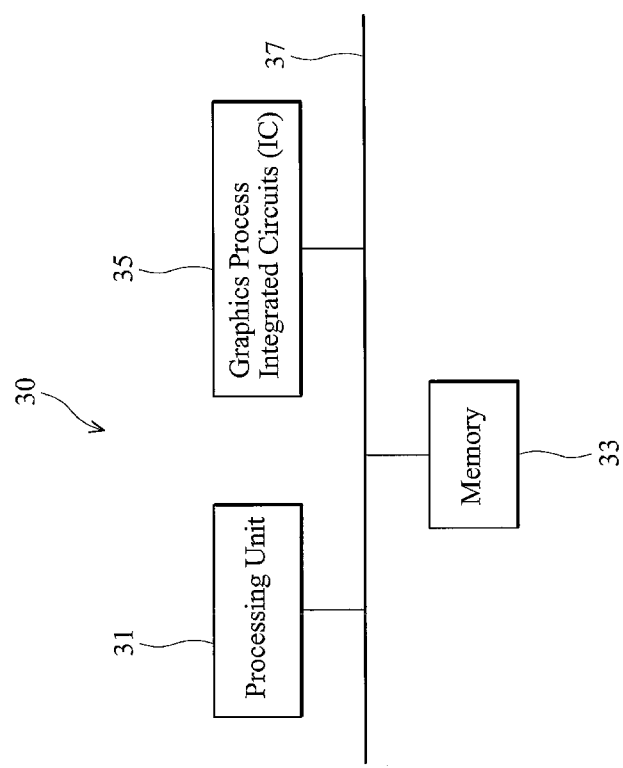
FIG. 3 is a diagram of a hardware environment applicable to an embodiment of a system for a 3D computer graphics shading process compiler.

FIG. 3 is a diagram of a hardware environment applicable to an embodiment of a system for 3D computer graphics shading process compiler 30, comprising a processing unit 31, memory 33 and a graphics process integrated circuits (IC) 35. The memory 33 preferably stores program modules executed by the processing unit 31 to perform shading process compiler methods. Generally, program modules include routines, programs, objects, components, data or others, that perform particular tasks or implement particular abstract data types. The graphics process IC 35 comprises various hardware circuits to provide functions for the stages of the pipeline.

Figure 4:
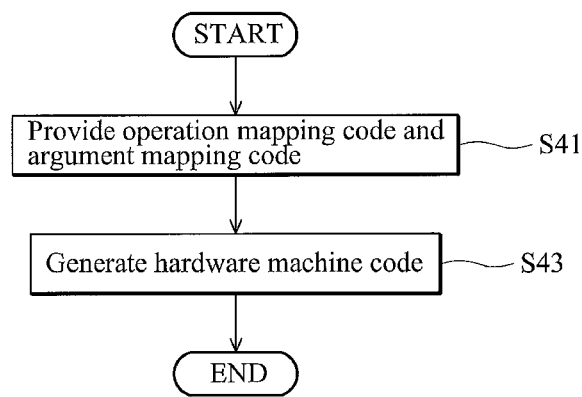
FIG. 4 is a flowchart illustrating an embodiment of a method for a 3D computer graphics shading process compiler.

FIG. 4 is a flowchart illustrating an embodiment of a method for shading process compiler of 3D computer graphics, performed by the processing unit 31. The embodiment of the method for 3D computer graphics shading process compiler is preferably employed in the fixed-function multi-texturing process OP41 (FIG. 2) to generate hardware machine code required by the graphics process IC 35. In step S41, operation mapping code indicating an operation of the script, and argument mapping code indicating an argument associated with the operation is provided. In step S43, the hardware machine code is generated by performing a bitwise OR operation to the operation mapping code and the argument mapping code.

Figure 5:
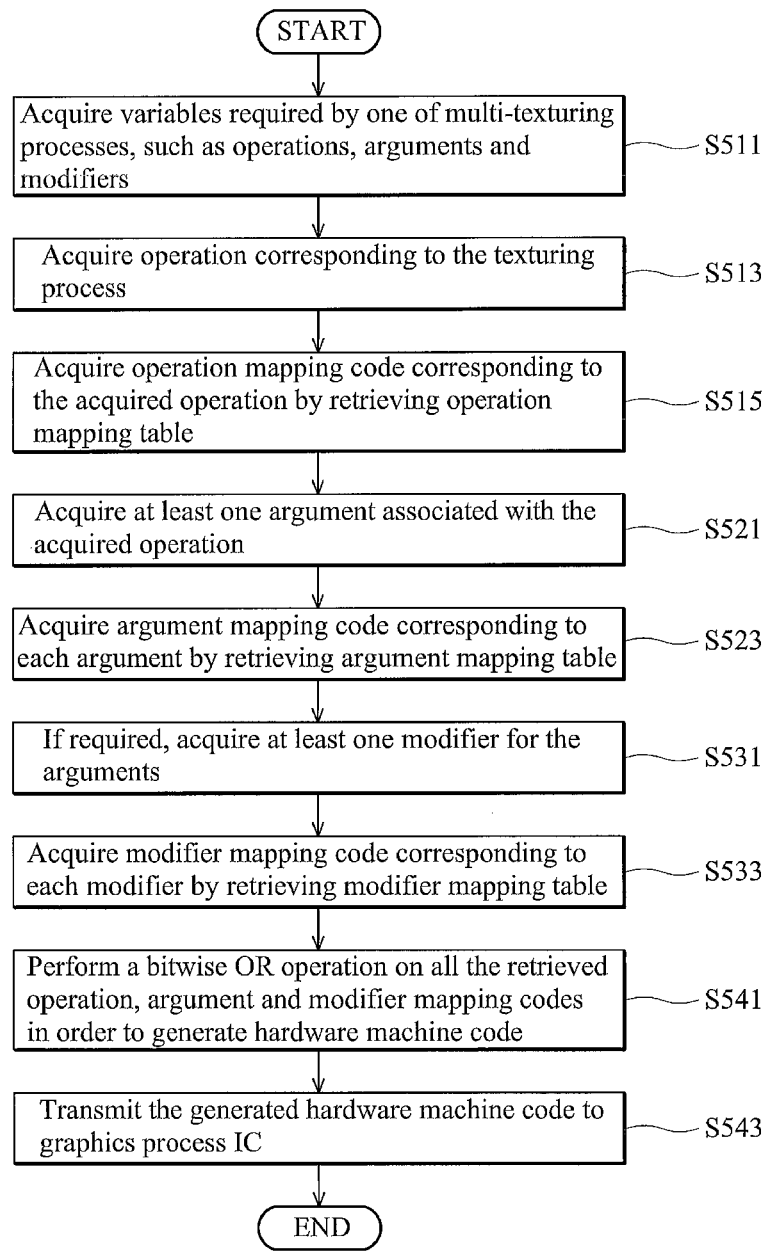
FIG. 5 is a flowchart illustrating an embodiment of a method for a 3D computer graphics shading process compiler.
Figure 6:
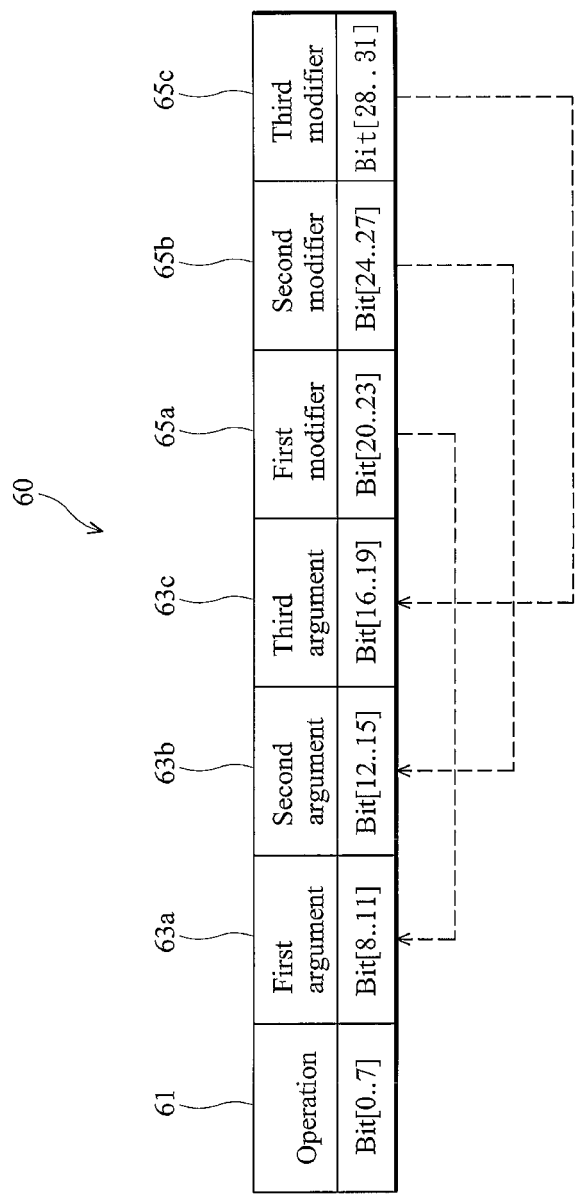
FIG. 6 is a diagram of an embodiment of the format of hardware machine code.

FIG. 5 is a flowchart illustrating an embodiment of a method for shading process compiler of 3D computer graphics, performed by the processing unit 31. The embodiment of the method for 3D computer graphics shading process compiler is preferably employed in the fixed-function multi-texturing process OP41 (FIG. 2) to generate hardware machine code required by the graphics process IC 35. FIG. 6 is a diagram of an embodiment of the format of hardware machine code 60, comprising an operation 61, arguments 63a to 63c, and modifiers 65a to 65c. In the hardware machine code applied in one of multi-texturing processes, the operation 61 is stored in bits [7:0], the arguments 63a to 63c for the operation 61 are respectively stored in [11:8], [15:12] and [19:16], the modifiers 65a to 65c of the arguments are respectively stored in bits [23:20], [27:24] and [31:28].

Referring to FIG. 5, in step S511, variables required by one of multi-texturing processes, such as operations, arguments and modifiers, are acquired. It is to be understood that 3D computer graphics shading process compiler typically comprises an embedded script parser. The script parser receives multiple scripts provided by an application (or user), and parses the required variables for one of multi-texturing processes. Then, the parsed variables are stored in the memory 33 (FIG. 3) for step S511.

In step S513, an operation corresponding to the texturing process is acquired. In step S515, operation mapping code corresponding to the acquired operation is acquired by retrieving an operation mapping table (i.e. operation mapping records therein). FIG. 7 is a diagram of an embodiment of an operation mapping table 70 comprising eight operation mapping records 71 to 78. Each operation mapping record comprises information indicating a particular operation 70a defined in a script instruction set is associated with operation mapping code 70b. The length of each operation mapping code 70b is the same as that of the hardware machine code 60 (FIG. 6). Bits [7:0] of each operation mapping code 70b store information associated with hardware machine code of an operation and bits [31:8] of it store "0".

Referring FIG. 5, in step S521, at least one argument associated with the acquired operation is acquired. In step S523, argument mapping code corresponding to each argument is acquired by retrieving an argument mapping table (i.e. argument mapping records therein). FIG. 8a is a diagram of an embodiment of a first argument mapping table 81 comprising five argument mapping records 811 to 815. Each first argument mapping record comprises information indicating a particular argument identifier 81a defined in the script instruction set is associated with argument mapping code 81b. The length of each argument mapping code 81b is the same as that of the hardware machine code 60 (FIG. 6). Bits [11:8] of each argument mapping code 81b store information associated with hardware machine code of a first argument and the remaining bits of it store "0". FIG. 8b is a diagram of an embodiment of a second argument mapping table 83 comprising five argument mapping records 831 to 835. Each second argument mapping record comprises information indicating a particular argument identifier 83a defined in the script instruction set is associated with argument mapping code 83b. The length of each argument mapping code 83b is the same as that of the hardware machine code 60 (FIG. 6). Bits [15:12] of each argument mapping codes 83b store information associated with hardware machine code of a second argument and the remaining bits of it store "0". FIG. 8c is a diagram of an embodiment of a third argument mapping table 85 comprising five argument mapping records 851 to 855. Each second argument mapping record comprises information indicating a particular argument identifier 85a defined in the script instruction set is associated with argument mapping code 85b. The length of each argument mapping code 85b is the same as that of the hardware machine code 60 (FIG. 6). Bits [19:16] of each argument mapping code 85b store information associated with hardware machine code of a third argument and the remaining bits of it store "0".

Figure 9A:
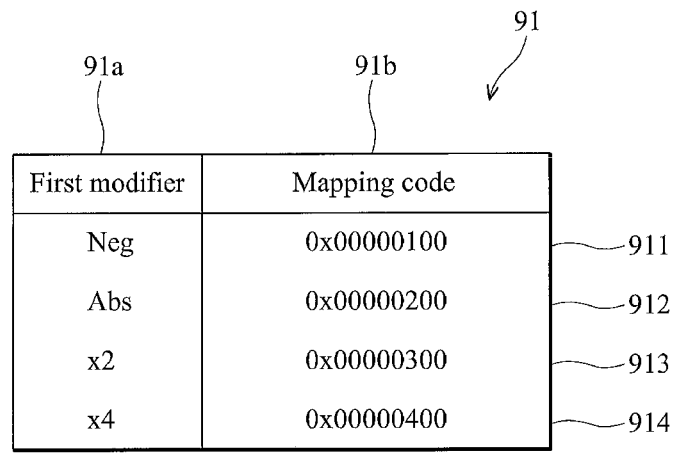
FIG. 9a is a diagram of an embodiment of a first modifier mapping table.
Figure 9B:
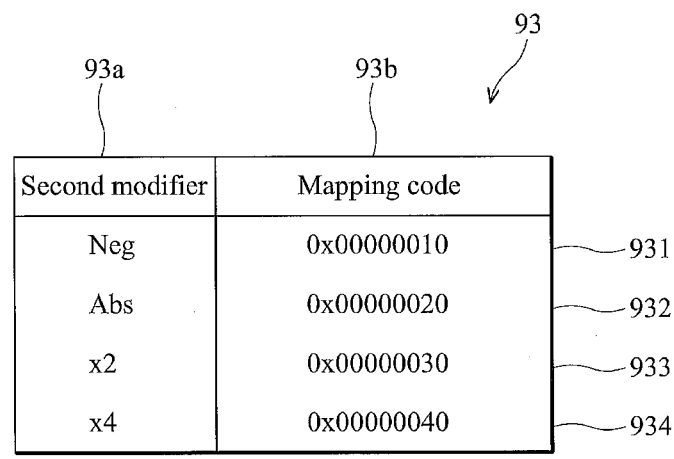
FIG. 9b is a diagram of an embodiment of a second modifier mapping table.

Referring FIG. 5, in step S531, if required, at least one modifier for the arguments is acquired (if required for the argument). In step S533, modifier mapping code corresponding to each modifier is acquired by retrieving a modifier mapping table (i.e. modifier mapping records therein). FIG. 9a is a diagram of an embodiment of a first modifier mapping table 91 comprising four modifier mapping records 911 to 914. Each first modifier mapping record comprises information indicating a particular modifier identifier 91a defined in the script instruction set is associated with modifier mapping code 91b. The length of each argument mapping code 91b is the same as that of the hardware machine code 60 (FIG. 6). Bits [23:20] of each argument mapping code 91b store information associated with hardware machine code of a first modifier and the remaining bits of it store "0". FIG. 9b is a diagram of an embodiment of a second modifier mapping table 93 comprising four modifier mapping records 931 to 934. Each second modifier mapping record comprises information indicating a particular modifier identifier 93a defined in the script instruction set is associated with modifier mapping code 93b. The length of each argument mapping code 93b is the same as that of the hardware machine code 60 (FIG. 6). Bits [27:24] of each argument mapping code 93b store information associated with hardware machine code of a second modifier and the remaining bits of it store "0". FIG. 9c is a diagram of an embodiment of a third modifier mapping table 95 comprising four modifier mapping records 951 to 954. Each second modifier mapping record comprises information indicating a particular modifier identifier 95a defined in the script instruction set is associated with modifier mapping code 95b. The length of each argument mapping code 95b is the same as that of the hardware machine code 60 (FIG. 6). Bits [31:28] of each argument mapping code 95b store information associated with hardware machine code of a third modifier and the remaining bits of it store "0".

Referring to FIG. 5, in step S541, a bitwise OR operation is performed on all the retrieved operation, argument and modifier mapping codes in order to generate hardware machine code corresponding to the designated texturing process. In step S543, the generated hardware machine code is transmitted to the graphics process IC 35 (FIG. 3) in order to direct the graphics process IC 35 to complete the designated texturing process.

Figure 10:
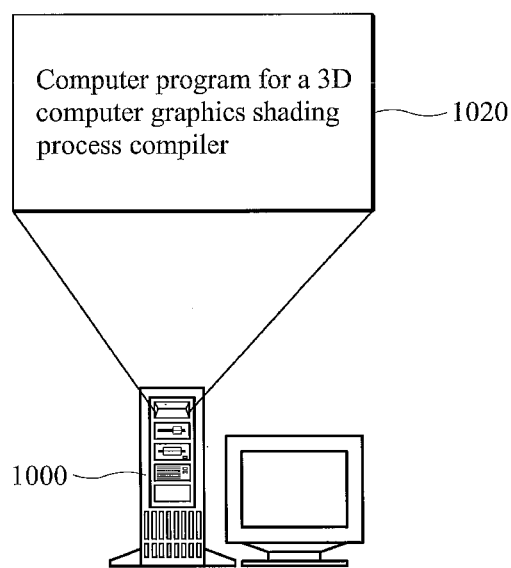
FIG. 10 is a diagram of an embodiment of a storage medium for storing a computer program for a 3D computer graphics shading process compiler.

Also disclosed is a storage medium 1000 as shown in FIG. 10 storing a computer program 1020 containing computer readable program code. The disclosed methods for shading process compiler of 3D computer graphics are implemented with the processing unit 31 (FIG. 3) loading and executing the computer readable program code.

Systems and methods, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer system and the like, the machine becomes an apparatus for practicing the invention. The disclosed methods and apparatuses may also be embodied in the form of program code transmitted over some transmission medium, such as electrical wiring or cabling, through fiber optics, or via any other form of transmission, wherein, when the program code is received and loaded into and executed by a machine, such as a computer or an optical storage device, the machine becomes an apparatus for practicing the invention. When implemented on a general-purpose processor, the program code combines with the processor to provide a unique apparatus that operates analogously to specific logic circuits.

Figure 11:
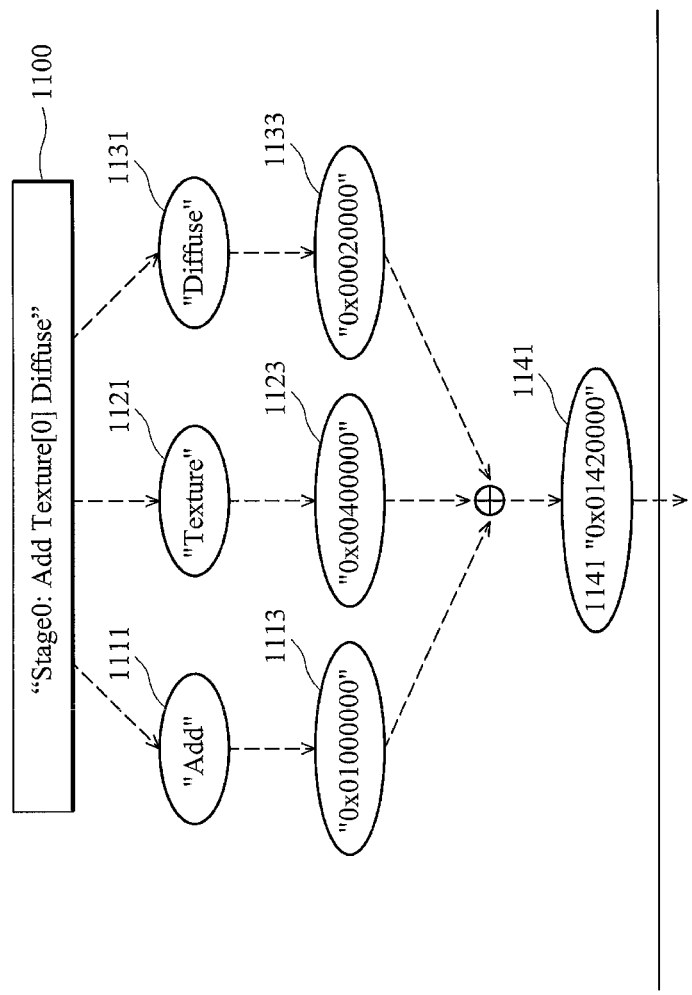
FIG. 11 is a diagram illustrating a first example of the shading process compiler of 3D computer graphics.

Two examples of detailed executions by the disclosed methods for a 3D computer graphics shading process compiler are provided in the following. FIG. 11 is a diagram illustrating shading process compiler of 3D computer graphics. FIG. 11 shows how to convert a script "Stage0: Add Texture[0] Diffuse" 1100 provided by an application (or user) into hardware machine code for a texturing process. Referring to FIG. 5, in step S511, an operation "Add" 1111, a first argument "Texture" 1121 and a second argument "Diffuse" 1131 of the script 1100 for the texturing process are acquired. In steps S513 and S515, referring to the record 71 of FIG. 7, operation mapping code "0x01000000" 1113 associated with the acquired operation is acquired. In steps S521 and S523, referring to the record 814 of FIG. 8a and the record 832 of FIG. 8b, argument mapping code "0x00400000" 1123 and "0x00020000" 1133 respectively associated with the acquired arguments are acquired. In step S541, the bitwise OR operation is performed to the acquired operation mapping code 1113 and argument mapping code 1123 and 1133 in order to generate hardware machine code "0x01420000" 1141 in response to the script 1100.

Figure 12:
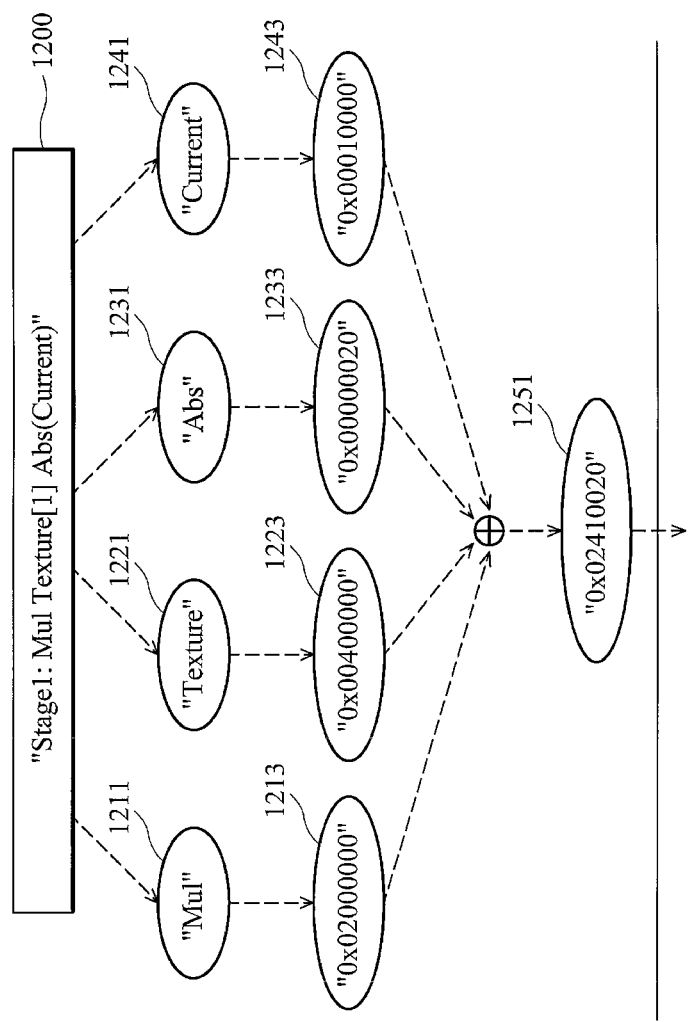
FIG. 12 is a diagram illustrating a second example of the shading process compiler of 3D computer graphics.

FIG. 12 is a diagram illustrating shading process compiler of 3D computer graphics. FIG. 12 shows how to convert a script "Stage1: Mul Texture[1] Abs(Current)" 1200 provided by an application (or user) into hardware machine code for another texturing process. Referring to FIG. 5, in step S511, an operation "Mul" 1211, a first argument "Texture" 1221, a second argument "Current" 1241 and a second modifier "Abs" 1231 of the script 1200 for the texturing process are acquired. In steps S513 and S515, referring to the record 72 of FIG. 7, operation mapping code "0x02000000" 1213 associated with the acquired operation is acquired. In steps S521 and S523, referring to the record 814 of FIG. 8a and the record 831 of FIG. 8b, argument mapping code "0x00400000" 1123 and "0x00010000" 1143 respectively associated with the acquired arguments are acquired. In steps S531 and S533, referring to the record 932 of FIG. 9b, modifier mapping code "0x00000020" 1233 associated with the acquired second modifier is acquired. In step S541, the bitwise OR operation is performed to the acquired operation mapping code 1213, argument mapping code 1223 and 1243, and modifier mapping code 1233, in order to generate hardware machine code "0x02410020" 1251 in response to the script 1200.

Certain terms are used throughout the description and claims to refer to particular system components. As one skilled in the art will appreciate, consumer electronic equipment manufacturers may refer to a component by different names. This document does not intend to distinguish between components that differ in name but not function.

Although the invention has been described in terms of preferred embodiment, it is not limited thereto. Those skilled in this technology can make various alterations and modifications without departing from the scope and spirit of the invention. Therefore, the scope of the invention shall be defined and protected by the following claims and their equivalents.

What is claimed is:

1. A method for converting a script into hardware machine code corresponding to the script for a graphics process integrated circuit, comprising:
    parsing the script and obtaining an operation and an argument of the operation;
    acquiring an operation mapping code from an operation mapping table based on the operation, wherein the operation mapping table comprises a plurality of operation mapping records corresponding to a script instruction set;
    acquiring an argument mapping code from an argument mapping table based on the argument, wherein a length of the operation mapping code and a length of the argument mapping code are each equal to a length of the hardware machine code, the hardware machine code being specific to the processor architecture of the integrated circuit used to carry out execution of the script and rendering of the script-driven graphics; and
    generating the hardware machine code by performing a bitwise OR operation on the operation mapping code and the argument mapping code by ORing corresponding bits of the operation mapping code and the argument mapping code; and transmitting the generated hardware machine code to a process integrated circuit (IC) for executing a process corresponding to the operation in the script;

wherein the hardware machine code stores information associated with the operation in a first bit range, and the argument in a second bit range, the operation mapping code is operative to store zeros in bits other than the first bit range, and the argument mapping code is operative to store zeros in bits other than the second bit range.

2. The method as claimed in claim 1 further comprising:
providing a modifier mapping code indicating a modifier associated with the argument; and
generating the hardware machine code by performing the bitwise OR operation to the operation mapping code, the argument mapping code and the modifier mapping code.

3. The method as claimed in claim 2, wherein the hardware machine code stores information associated with the operation in a first bit range, the argument in a second bit range, and the modifier in a third bit range, the operation mapping code is operative to store zero in bits other than the first bit range, the argument mapping code is operative to store zero in bits other than the second bit range, and the modifier mapping code is operative to store zero in bits other than the third bit range.

4. The method as claimed in claim 2 further comprising:
providing a modifier mapping record comprising information indicating the modifier defined by a script instruction set, and the modifier associated with the modifier mapping code; and
acquiring the modifier mapping code by retrieving the modifier mapping record.

5. The method as claimed in claim 2, wherein the modifier mapping code is mapped from a modifier mapping table, and a size of the modifier mapping code is the same as that of the hardware machine code, wherein the hardware machine code is generated by ORing a bit of the operation mapping code with an associated bits of the argument mapping code and the modifier mapping code.

6. The method as claimed in claim 1, wherein the lengths of both the operation mapping code and the argument mapping code are the same as the length of the hardware machine code.

7. The method as claimed in claim 1 further comprising:
providing an operation mapping record comprising information indicating the operation defined by a script instruction set, and the operation associated with the operation mapping code; and
acquiring the operation mapping code by retrieving the operation mapping record.

8. The method as claimed in claim 1 further comprising:
providing an argument mapping record comprising information indicating the argument defined by a script instruction set, and the argument associated with the argument mapping code; and
acquiring the argument mapping code by retrieving the argument mapping record.

9. The method as claimed in claim 1 further comprising:
providing an operation mapping record comprising information indicating the operation defined by a script instruction set, and the operation associated with the operation mapping code;
acquiring the operation mapping code by retrieving the operation mapping record;
providing an argument mapping record comprising information indicating the argument defined by a script instruction set, and the argument associated with the argument mapping code; and
acquiring the argument mapping code by retrieving the argument mapping record.

10. A non-transitory machine-readable storage medium for storing a computer program which, when executed, converts a script into hardware machine code corresponding to the script for a graphics process integrated circuit, the method comprising the steps of:
providing an operation mapping code indicating an operation of the script, and argument mapping code indicating an argument associated with the operation, wherein the operation mapping code is mapped from an operation mapping table and the argument mapping code is mapped from an argument mapping table, and the operation mapping code and the argument mapping code both having a size as that of the hardware machine code; and
combining information of both the operation mapping code and the argument mapping code to generate the hardware machine code, wherein the information is embedded in allocated fields of the hardware machine code, the generating of hardware machine code by performing a bitwise OR operation on the operation mapping code and the argument mapping code by ORing corresponding bits of the operation mapping code and the argument mapping code, the hardware machine code being specific to the processor architecture of the integrated circuit used to carry out execution of the script and rendering of the script-driven graphics;
wherein the hardware machine code stores information associated with the operation in a first bit range, and the argument in a second bit range, the operation mapping code is operative to store zeros in bits other than a first bit range, and the argument mapping code is operative to store zeros in bits other than a second bit range.

11. A 3D computer graphics shading process compiler system, comprising:
a graphics process integrated circuit (IC); and
a processing unit embodied in an integrated circuit, connected to the graphics process IC, providing an operation mapping code indicating an operation of the script, and argument mapping code indicating an argument associated with the operation, wherein the operation mapping code is mapped from an operation mapping table and the argument mapping code is mapped from an argument mapping table, the operation mapping code and the argument mapping code both having a size as that of the hardware machine code, generating the hardware machine code by performing a bitwise OR operation to the operation mapping code and the argument mapping code by ORing a bit of the operation mapping code with an associated bit of the argument mapping code, and transmitting the hardware machine code to the graphics process IC to direct the graphics process IC to complete a texturing process, the hardware machine code being specific to the processor architecture of the integrated circuit used to carry out execution of the script and rendering of the script-driven graphics;
wherein the hardware machine code stores information associated with the operation in a first bit range, and the argument in a second bit range, the operation mapping code is operative to store zero in bits other than a first bit range, and the argument mapping code is operative to store zero in bits other than a second bit range.

12. The system as claimed in claim 11 wherein the processing unit provides a modifier mapping code indicating a modifier associated with the argument and generates the hardware machine code by performing the bitwise OR operation to the operation mapping code, the argument mapping code and the modifier mapping code.

13. The system as claimed in claim 12 further comprising memory, wherein the memory provides a modifier mapping record comprising information indicating the modifier defined by a script instruction set, and the modifier associated with the modifier mapping code, and the processing unit acquires the modifier mapping code by retrieving the modifier mapping record.

14. The system as claimed in claim 12, wherein the modifier mapping code is mapped from a modifier mapping table, and a size of the modifier mapping code is the same as that of the hardware machine code, wherein the hardware machine code is generated by ORing a bit of the operation mapping code with an associated bits of the argument mapping code and the modifier mapping code.

15. The system as claimed in claim 11 wherein the hardware machine code stores information associated with the operation in a first bit range, the argument in a second bit range, and the modifier in a third bit range, the operation mapping code is operative to store zero in bits other than the first bit range, the argument mapping code is operative to store zero in bits other than the second bit range, and the modifier mapping code is operative to store zero in bits other than the third bit range.

16. The system as claimed in claim 11 wherein the lengths of both the operation mapping code and the argument mapping code are the same as the length of the hardware machine code.

17. The system as claimed in claim 16 wherein the hardware machine code stores information associated with the operation in a first bit range, and the argument in a second bit range, the operation mapping code is operative to store zero in bits other than the first bit range, and the argument mapping code is operative to store zero in bits other than the second bit range.

18. The system as claimed in claim 11 further comprising memory, wherein the memory provides an operation mapping record comprising information indicating the operation defined by a script instruction set, and the operation associated with the operation mapping code, and the processing unit acquires the operation mapping code by retrieving the operation mapping record.

19. The system as claimed in claim 11 further comprising memory, wherein the memory provides an argument mapping record comprising information indicating the argument defined by a script instruction set, and the argument associated with the argument mapping code, and the processing unit acquires the argument mapping code by retrieving the argument mapping record.

20. The system as claimed in claim 11 further comprising memory, wherein the memory provides an operation mapping record comprising information indicating the operation defined by a script instruction set, and the operation associated with the operation mapping code, the processing unit acquires the operation mapping code by retrieving the operation mapping record, the memory provides an argument mapping record comprising information indicating the argument defined by a script instruction set, and the argument associated with the argument mapping code, and the processing unit acquires the argument mapping code by retrieving the argument mapping record.

21. A method for converting a script into hardware machine code corresponding to the script for a graphics process integrated circuit, wherein the hardware machine code stores information associated with an operation in a first bit range and an argument in a second bit range, comprising:
acquiring an operation mapping code from an operation mapping table based on the operation, wherein the operation mapping table comprises a plurality of operation mapping records corresponding to a script instruction set;
acquiring an argument mapping code from an argument mapping table based on the argument, wherein a length of the operation mapping code and a length of the argument mapping code are each equal to a length of the hardware machine code;
providing the operation mapping code indicating an operation of the script, and the argument mapping code indicating the argument associated with the operation, wherein the operation mapping code and the argument mapping code both having a size as that of the hardware machine code and both having a first range and second range as the hardware machine code, wherein the operation mapping code stores information associated with hardware machine code of the operation in the first range and the operation mapping code is operative to store zeros in the second bit range, and the argument mapping code stores information associated with hardware machine code of the argument in the second range and is operative to store zeros in the first bit range; and
generating the hardware machine code by performing a bitwise OR operation to the operation mapping code and the argument mapping code by ORing a bit of the operation mapping code with an associated bit of the argument mapping code, the hardware machine code being specific to the processor architecture of the integrated circuit used to carry out execution of the script and rendering of the script-driven graphics;
wherein the hardware machine code stores information associated with the operation in a first bit range, and the argument in a second bit range, the operation mapping code is operative to store zero in bits other than a first bit range, and the argument mapping code is operative to store zero in bits other than a second bit range.

22. The method as claimed in claim 21, further comprising:
providing a modifier mapping code indicating a modifier associated with the hardware machine code, wherein the hardware machine code stores information associated with the modifier in a third bit range of the hardware machine code; and
generating the hardware machine code by performing the bitwise OR operation by ORing a bit of the modifier mapping code with associate bits of the operation mapping code and the argument mapping code.

23. The method as claimed in claim 22, wherein the operation mapping code stores information associated with hardware machine code of the modifier in the third range, and the argument mapping code is operative to store zeros in the first range and the second range.

24. The method as claimed in claim 21, wherein a length of the first range is the same as a length of the second range.

25. The method as claimed in claim 21, wherein a length of each of the first range of the operation mapping code is identical for storing information associated with hardware machine code of the operation.

26. The method as claimed in claim 21, wherein the hardware machine code converting from the script comprises conditional branches.

27. The method as claimed in claim 21, further comprising an additional second bit range in the hardware machine code for storing an additional argument.

28. The method as claimed in claim 21, further comprising an additional third bit range in the hardware machine code for storing an additional modifier.

29. A method for converting a script into hardware machine code corresponding to the script for a graphics process integrated circuit, comprising:
converting a script into hardware machine code corresponding to the script for a graphics process integrated circuit
acquiring an operation mapping code from an operation mapping table based on the operation, wherein the operation mapping table comprises a plurality of operation mapping records corresponding to a script instruction set;
acquiring an argument mapping code from an argument mapping table based on the argument, wherein a length of the operation mapping code and a length of the argument mapping code are each equal to a length of the hardware machine code; and
generating the hardware machine code by performing a bitwise OR operation to the operation mapping code and the argument mapping code by ORing a bit of the operation mapping code with an associated bit of the argument mapping code, the hardware machine code being specific to the processor architecture of the integrated circuit used to carry out execution of the script and rendering of the script-driven graphics;
wherein the hardware machine code stores information associated with the operation in a first bit range, and the argument in a second bit range, the operation mapping code is operative to store zero in bits other than a first bit range, and the argument mapping code is operative to store zero in bits other than a second bit range.

30. The method as claimed in claim 29, further comprising:
providing a modifier mapping code indicating a modifier associated with the hardware machine code, wherein the modifier mapping code have the same format with the operation mapping code and the argument mapping code; and
generating the hardware machine code by performing the bitwise OR operation by ORing a bit of the modifier mapping code with associate bits of the operation mapping code and the argument mapping code.

31. The method as claimed in claim 30, wherein the operation mapping code is operative to store zeros in bits associated with the modifier mapping code, the argument mapping code is operative to store zeros in bits associated with the modifier mapping code, and the modifier mapping code is operative to store zeros in bits associated with the operation mapping code and the argument mapping code.

32. The method as claimed in claim 29, wherein a length used for storing information associated with hardware machine code of the operation in the operation mapping code is the same as a length used for storing information associated with hardware machine code of the argument in the argument mapping code.

33. The method as claimed in claim 29, wherein a length used for storing information associated with hardware machine code of the operation comprises a same amount of bits.

34. The method as claimed in claim 29, wherein the hardware machine code converting from the script comprises conditional branches.

35. The method as claimed in claim 29, further comprising additional bits in the hardware machine code for storing an additional argument.

36. The method as claimed in claim 29, further comprising additional bits in the hardware machine code for storing an additional modifier.

37. A method for converting a script into hardware machine code corresponding to the script for a graphics process integrated circuit, comprising:
acquiring an operation, an argument, and a modifier of a script used for a texturing process;
acquiring an operation mapping code from an operation mapping table based on the operation, wherein the operation mapping table comprises a plurality of operation mapping records corresponding to a script instruction set;
acquiring an argument mapping code from an argument mapping table based on the argument, wherein a length of the operation mapping code and a length of the argument mapping code are each equal to a length of the hardware machine code;
performing a bitwise OR operation to the operation mapping code and the argument mapping code to generate a hardware machine; and
transmitting the hardware machine code to the graphics process integrated circuit used for the texturing process;
wherein the hardware machine code stores information associated with the operation in a first bit range, and the argument in a second bit range, the operation mapping code is operative to store zero in bits other than a first bit range, and the argument mapping code is operative to store zero in bits other than a second bit range, the hardware machine code being specific to the processor architecture of the integrated circuit used to carry out execution of the script and rendering of the script-driven graphics.

38. The method as claimed in claim 37, further comprising:
acquiring a modifier mapping code corresponding to the modifier by retrieving a modifier mapping table, wherein the modifier mapping code is operative to store zeros in bits associated with the operation mapping code and the argument mapping code; and
performing a bitwise OR operation to the modifier mapping code, the operation mapping code and the argument mapping code to generate the hardware machine code.

39. The method as claimed in claim 37, wherein a length used for storing information associated with hardware machine code of the operation in the operation mapping code is the same as a length used for storing information associated with hardware machine code of the argument in the argument mapping code.

40. The method as claimed in claim 37, wherein a length used for storing information associated with hardware machine code of the operation comprises a same amount of bits.

41. The method as claimed in claim 37, wherein the hardware machine code converting from the script comprises conditional branches.

42. The method as claimed in claim 37, further comprising additional bits in the hardware machine code for storing an additional argument.

43. The method as claimed in claim 37, further comprising additional bits in the hardware machine code for storing an additional modifier.

* * * * *